UNITED STATES PATENT OFFICE.

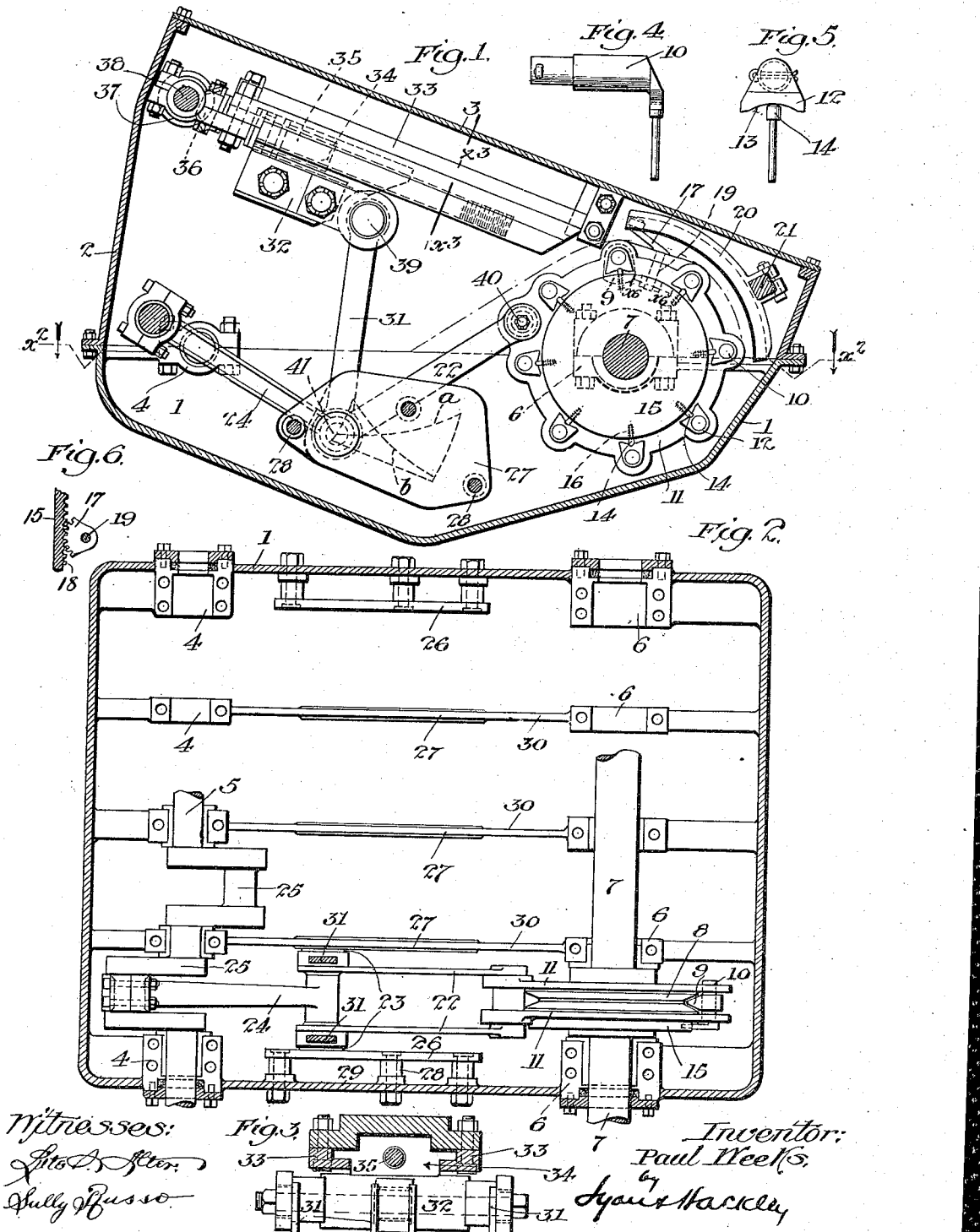
P. WEEKS.
CHANGE SPEED MECHANISM.
APPLICATION FILED APR. 29, 1912. RENEWED JAN. 11, 1916.
1,201,125.  Patented Oct. 10, 1916.
Witnesses:
Inventor:
Paul Weeks

PAUL WEEKS, OF LOS ANGELES, CALIFORNIA, ASSIGNOR TO FELLOWS DIRECT POWER TRANSMISSION COMPANY, OF LOS ANGELES, CALIFORNIA, A CORPORATION OF ARIZONA.

CHANGE-SPEED MECHANISM.

1,201,125.  Specification of Letters Patent.  Patented Oct. 10, 1916.

Application filed April 29, 1912, Serial No. 694,004. Renewed January 11, 1916. Serial No. 71,573.

*To all whom it may concern:*

Be it known that I, PAUL WEEKS, a citizen of the United States, residing at Los Angeles, in the county of Los Angeles and State of California, have invented new and useful Improvements in Change-Speed Mechanism, of which the following is a specification.

This invention relates to change speed mechanism of the intermittent grip type, and the object of the invention is to place the mechanism in most compact form, and to reduce the stroke of the oscillatory driven member to nothing when the parts are adjusted to neutral position. In devices heretofore employed of the particular type of which this is an improvement, when the parts were adjusted to neutral position there was still a slight movement of the oscillatory device which, in the present invention, I have eliminated by providing a construction which enables the adjusting link which controls the movement of the center joint of the toggle to be adjusted into a position which coincides with the pivotal connection between the oscillator and its driving link, so that when the adjusting link is in this position, even though its free end is operated through a wide arc by the pitman driven from the crank, the link connected with the oscillatory device will swing uniformly with the adjusting link and no motion will be given to the oscillatory device.

Another object is to provide a construction which will house the parts and enable them to run in a bath of oil, and a further object is to provide guides for the toggle members which will prevent flexure of the toggle members and give them rigid support throughout their stroke.

Referring to the drawings: Figure 1 is a vertical section through the invention. Fig. 2 is a section on line $x^2$—$x^2$, Fig 1. Fig. 3 is a section on line $x^3$—$x^3$, Fig. 1. Fig. 4 is a side view in detail of one of the dog supporting arms. Fig. 5 is an end view of the dog supporting arm. Fig. 6 is a section on line $x^6$—$x^6$, Fig. 1.

1 designates a base to which is bolted the cap 2 which has a removable top plate 3. Supported in bearings 4 is the crank shaft 5 and supported in bearings 6 is the rotating driven shaft 7. Rigidly secured on the driven shaft 7 is a series of grooved disks 8, only one of which is herein shown. Each disk 8 is driven by an oscillatory device consisting of a series of wedge-shaped dogs 9, each dog 9 being carried on a shaft 10, shown in detail in Figs. 4 and 5, each shaft 10 being journaled in a pair of plates 11 which are mounted to loosely rock on the shaft 7. Each shaft 10 has a leaf 12 with a concave face 13, and a pin 14 bears against the concave face 13, the pin 14 being slidable radially in an adjusting disk 15 and being outwardly pressed constantly by a spring 16. The regulating disk 15 is capable of angular movement with respect to the disk 11, but rocks coincidentally with the disk 11, it only having an angular movement with respect thereto when it is adjusted. An adjusting crank 19 pivoted in disk 11 carries on its pivotal portion a segment gear 17 meshing with teeth 18 in disk 15, (see Fig. 6). The outer end of the crank 19 rides in a segmental track 20 which is carried on a bar 21 and may be shifted to swing the crank 19 and shift the disk 15 to cause the pins 14 to tilt the leaves 12 in either direction, and thereby rock the associated dogs 9 into position to drive the grooved disks 8 in either direction, or to be moved to midposition where they will be out of contact with the grooved disks 8.

Connected to the disks 11 are two links 22 which are connected to a pin 23. A pitman 24 is connected to the pin 23 and to a crank 25 on the crank shaft 5. The ends of the pin 23 slide between guides 26 and 27, the guides 26 being supported by studs 28 from the side wall 29 of the base 1, while the guides 27 are formed on webs 30 which extend longitudinally through the base 1 and prevent lateral movement of the toggle thus formed by the pitman 24 and links 22. Adjusting links 31 extend from the pin 23 to an adjustment block 32 which slides on inclined guides 33, and the block 32 has a nut 34 which is engaged by a screw 35 with beveled gear 36 on its end, which meshes with a beveled gear 37 on a cross shaft 38, so that by turning the cross shaft 38 the screw 35 will be rotated to move the block 32 along the guides 33 and thus adjust the upper ends of the links 31 which will alter the path described by the center joint of the toggle and thereby vary the stroke of the oscillating device. When the block 32 is adjusted into the position shown in Fig. 1, the greatest stroke will be given to the oscillating device, during the time the joint 41 travels in a path designated by dotted line $a$ in Fig. 1, while by moving the block 32 to the extreme right it will bring the upper joint 39 of the links 31 into axial alinement with the joint 40 of the links 22 and, although the toggle joint 41 takes its complete movement, the joint 40 will not be moved angularly, but will remain at rest in close relation to the joint 39, during which time the joint 41 travels in a path designated by dotted line $b$ in Fig. 1, and thus no motion will be imparted to the oscillating device or driven shaft 7 because both links 31 and links 22 swing on a common center in line with joint 40 and their lower ends travel together at joint 41 along dotted line $b$. Intermediate speeds are obtained by adjusting the block 32 to intermediate points between the extremes.

It is essential that the parts be proportioned and arranged so that all points of the various paths which are ever traversed by the joint 41, include the extreme paths designated at $a$ and $b$, be located below a straight line drawn from shaft 4 to shaft 7 to prevent links 22 and connecting rod 24 ever swinging into a straight line on a dead center with each other, which would make the device inoperative because under such conditions the momentum of the parts in swinging toward the dead center would carry the joint 41 past the dead center and stoppage of movement or breakage would occur.

What I claim is:

1. In a change speed gearing, a driven shaft, an oscillatory device on the shaft, a pitman, a link from the pitman to the oscillatory device, an adjusting link connected to the joint between the pitman and first link, a guide extending toward the oscillatory device, and a cross head sliding on the guide, the outer end of the adjustment link being connected to the cross head, and means for moving said crosshead in said guide to vary the relative position of said first link and said adjusting link, whereby the stroke of the oscillatory device is varied from maximum to zero.

2. In a change speed gearing, a driven shaft, an oscillatory device on the shaft, a pitman, a link from the pitman to the oscillatory device, an adjusting link connected to the joint between the pitman and first link, inclined guides extending to a point close to the oscillatory device, a block sliding in said guides, the upper end of the adjusting link being pivoted to said block, a nut carried by said block, a screw engaging said nut, and means for rotating said screw to move said block in said guides to vary the relative position of said first link and said adjusting link, whereby the stroke of the oscillatory device is varied from maximum to zero.

3. In a change speed gearing, a driven shaft, an oscillatory device on the shaft, a pitman, a link from the pitman to the oscillatory device, an adjusting link connected to the joint between the pitman and first link, means for adjusting the outer end of the adjustment link into close relation to the joint between the first link and oscillatory device to prevent movement of the oscillatory device when said adjusting link is in such position, guides having faces on each side of the joint between the pitman, adjusting link and first link to prevent lateral flexure thereof, and a pin extending through said latter joint, the ends of the pin bearing against said faces.

4. In a change speed gearing, a driven shaft, an oscillatory device on the shaft, a pitman, a link from the pitman to the oscillatory device, an adjusting link connected to the joint between the pitman and first link, inclined guides extending to a point close to the oscillatory device, a block sliding in said guides, the upper end of the adjusting link being pivoted to said block, a nut carried by said block, a screw engaging said nut, means for rotating said screw, and flat guide plates having faces on each side of the joint between the pitman adjusting link and first link to prevent lateral movement of said joint.

5. In a change speed gearing, a driven shaft, an oscillatory device on said shaft, a pitman, a link connecting said pitman and said oscillatory device, an adjusting link, one end of which is connected to said pitman and said first link, a sliding element, to which the other end of said adjusting link is pivoted, and a screw for moving said sliding element to vary the position of the pivot of said adjusting link to adjust the stroke of the oscillatory device from maximum to zero.

In testimony whereof, I have hereunto set my hand at Los Angeles, California this 13th day of March 1912.

PAUL WEEKS.

In presence of—
G. T. HACKLEY,
GLADYS RUSSELL.